US 6,296,397 B1

(12) United States Patent
Bavington et al.

(10) Patent No.: US 6,296,397 B1
(45) Date of Patent: Oct. 2, 2001

(54) OPTICAL FIBER CONNECTION PATCHING SYSTEM

(75) Inventors: Stephen G. Bavington, Nepean (CA); Bert A. Lindgren, Decatur, GA (US)

(73) Assignee: Net-Hopper System, Inc., Norcross, GA (US)

( * ) Notice: Subject to any disclaimer, the term of this patent is extended or adjusted under 35 U.S.C. 154(b) by 0 days.

(21) Appl. No.: 09/379,025

(22) Filed: Aug. 23, 1999

(51) Int. Cl.$^7$ ...................................................... G02B 6/36
(52) U.S. Cl. ................................. 385/53; 385/25; 385/26; 385/57; 385/55
(58) Field of Search ............................ 385/53, 15, 25, 385/26, 31, 55, 57, 16, 18–20, 50, 98, 99, 134

(56) References Cited

U.S. PATENT DOCUMENTS

| | | |
|---|---|---|
| 4,088,387 | 5/1978 | Lewis . |
| 4,378,144 | 3/1983 | Duck et al. . |
| 5,031,990 | 7/1991 | Mori . |
| 5,420,946 | * 5/1995 | Tsai .......................................... 385/22 |
| 5,450,509 | 9/1995 | Davis . |
| 5,661,826 | 8/1997 | Saito et al. . |
| 5,781,672 | 7/1998 | Cutts . |
| 5,920,667 | * 7/1999 | Tiao et al. ............................... 385/22 |
| 6,157,766 | * 12/2000 | Laniepce et al. ...................... 385/134 |

\* cited by examiner

*Primary Examiner*—Rodney Bovernick
*Assistant Examiner*—Sung Pak

(74) *Attorney, Agent, or Firm*—Needle & Rosenberg, P.C.

(57) ABSTRACT

An apparatus for making connections between a first plurality of optical channels and a second plurality of optical channels includes at least one fiber channel rotator, that includes a rotatable member, having a peripheral edge, disposed along a rotational plane and is rotatable about an axis. A first optical connector is optically coupled to a first optical channel and is in sliding engagement to the rotatable member adjacent to the peripheral edge. A rotational driver is coupled to the rotatable member so as to selectively cause the rotatable member to rotate about the axis and thereby direct the first optical connector to a selected angular position. The apparatus also includes at least one tower that includes a track, disposed adjacent to the rotatable member and transverse to the rotational plane of the rotatable member. A second optical connector, complementary to the first optical connector, is optically coupled to a second optical channel and is slidably engaged with the track so as to be able to move along the track. A linear driver drives the second optical connector along the track so as to cause the second optical connector to be moved to a selected linear position along the track. A controller, in control communication with rotational driver and the linear driver, causes the rotational driver to rotate the first optical connector to the selected angular position and causes the linear driver to move the second optical connector to the selected linear position, so that the first optical connector is adjacent the second optical connector. An actuator selectively causes the first optical connector and the second optical connector to engage, so that the first optical channel becomes optically coupled to the second optical channel.

15 Claims, 4 Drawing Sheets

OPTICAL FIBER CONNECTION PATCHING SYSTEM

BACKGROUND OF THE INVENTION

1. Field of the Invention

This invention relates to optical communication systems. More particularly, this invention relates to a method and apparatus for making connections between a first plurality of optical communications stations and a second plurality of optical communications stations.

2. The Prior Art

Switching of large optical communications networks is a complicated and expensive task. Typically, when one wishes to couple a first optical communications channel to a second optical communications channel, a technician must go to a patch panel, find the optical coupler connected to the first channel, find the optical coupler connected to the second channel and then connect the two optical couplers. This arrangement has the disadvantages of being time consuming, costly and prone to error.

Optical switching circuits have been developed that facilitate interconnection between optical channels. Such circuits are able to make connections very quickly and reliably. However, such circuits are expensive and, in many applications (such as changing optical computer network configurations), the speed of such circuits is unnecessary.

Therefore, there is a need for an inexpensive device for automatically connecting optical channels.

SUMMARY OF THE INVENTION

The above-noted disadvantages of the prior art are overcome by the present invention, which in one aspect is an apparatus for making connections between a first plurality of optical channels and a second plurality of optical channels. Included in the apparatus is at least one fiber channel rotator, that includes a rotatable member, having a peripheral edge, disposed along a rotational plane and is rotatable about an axis. A first optical connector is optically coupled to a first optical channel and is in sliding engagement with the rotatable member adjacent to the peripheral edge. A rotational driver is coupled to the rotatable member so as to selectively cause the rotatable member to rotate about the axis and thereby direct the first optical connector to a selected angular position. The apparatus also includes at least one tower that includes a track, disposed adjacent to the rotatable member and transverse to the rotational plane of the rotatable member. A second optical connector, complementary to the first optical connector, is optically coupled to a second optical channel and is slidably engaged with the track so as to be able to move along the track. A linear driver drives the second optical connector along the track so as to cause the second optical connector to be moved to a selected linear position along the track. A controller, in control communication with rotational driver and the linear driver, causes the rotational driver to rotate the first optical connector to the selected angular position and causes the linear driver to move the second optical connector to the selected linear position, so that the first optical connector is adjacent the second optical connector. An actuator selectively causes the first optical connector and the second optical connector to engage, so that the first optical channel becomes optically coupled to the second optical channel.

In another aspect, the invention includes a plurality of fiber channel rotators and a plurality of spaced apart towers circularly disposed about the plurality of fiber channel rotators.

In another aspect, the invention is a method of coupling a first optical fiber channel, terminating in a first optical connector, to a second optical fiber channel, terminating in a second optical connector, in which the first optical connector is rotated about an axis to an angular position. The second optical connector is moved along a linear path to a linear position so that the second optical connector is adjacent to the first optical connector. The first optical connector is engaged with the second optical connector so that the first optical fiber channel is optically coupled to the second optical fiber channel.

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
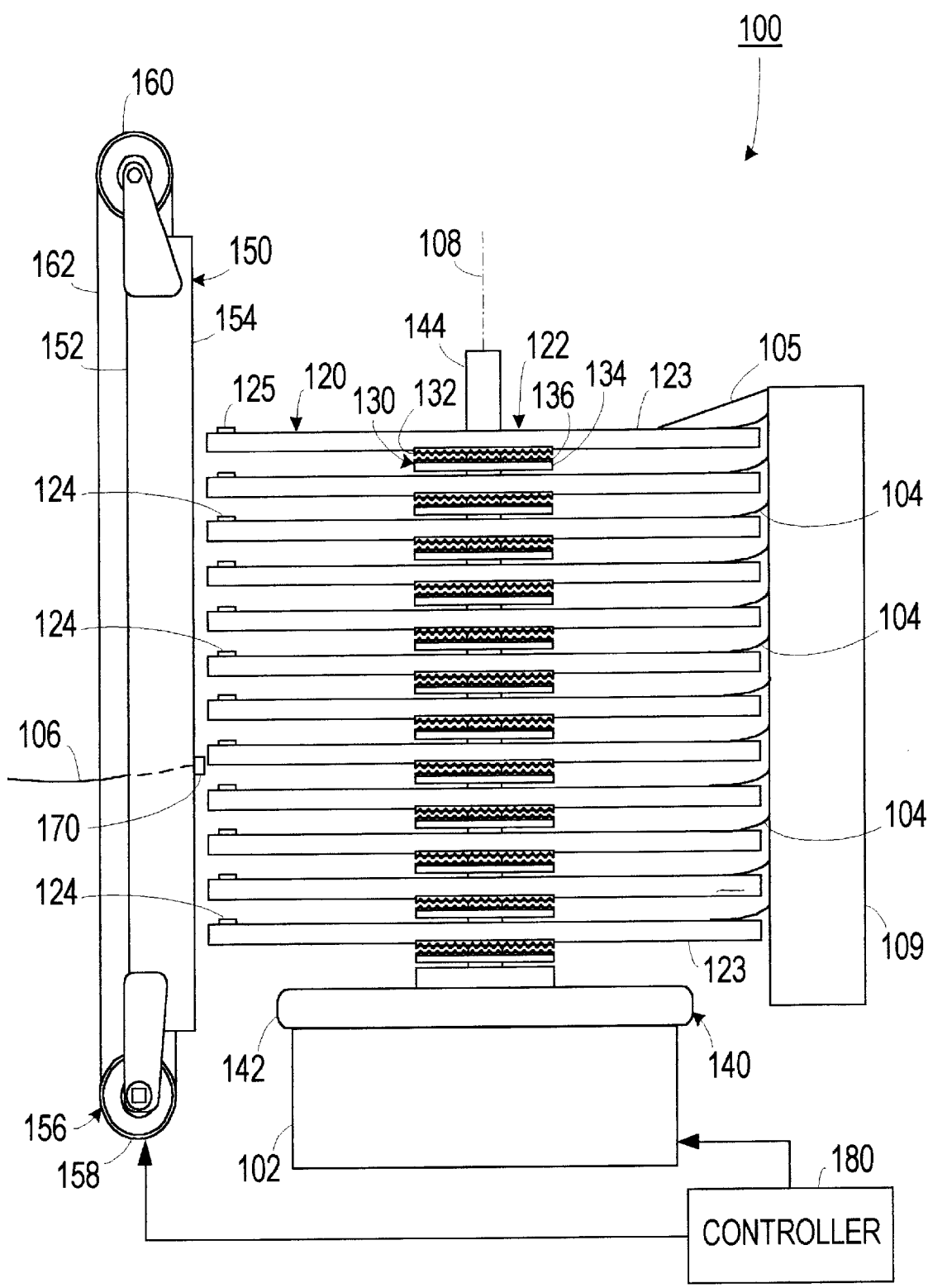
FIG. 1 is an elevational view of one embodiment of the invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

As used herein, "optical channel" includes both single and multiple fiber channels. For example, a full duplex fiber optic pair is an optical channel.

Figure 2A:
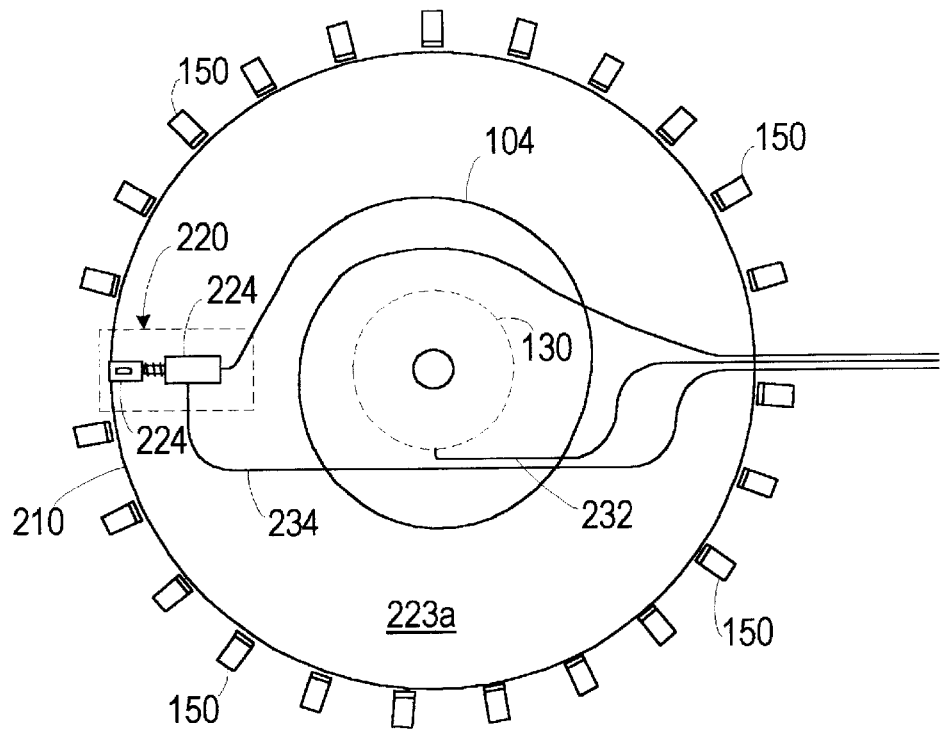
FIG. 2A is a top plan view of a first embodiment of the rotational member.
Figure 2B:
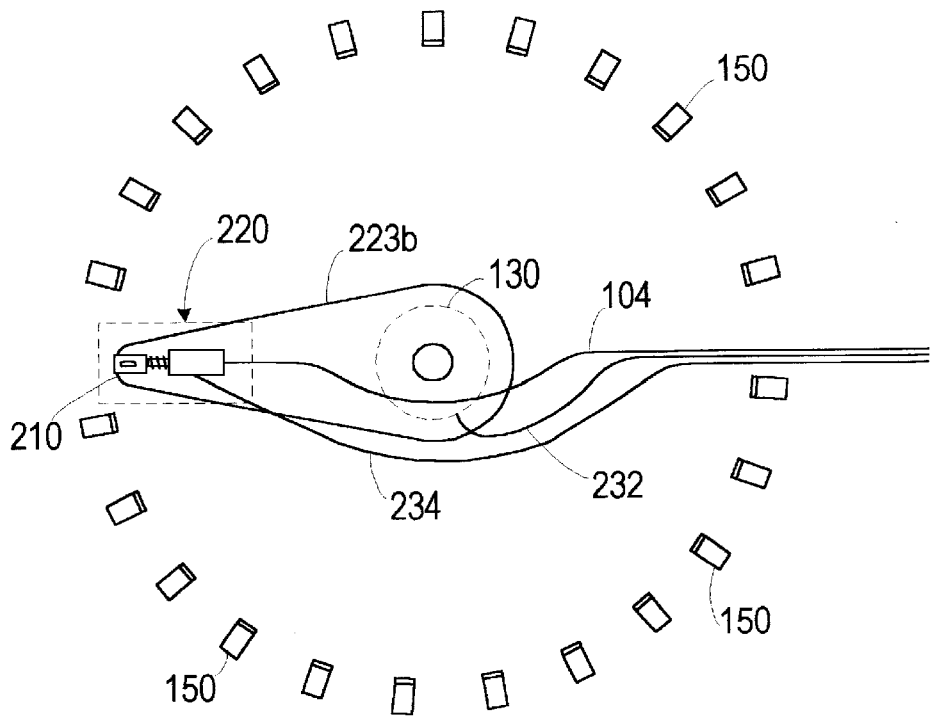
FIG. 2B is a top plan view of a second embodiment of the rotational member.

As shown in FIGS. 1, 2A and 2B, the invention is an apparatus 100 that makes connections between a first plurality of optical channels 104, each terminating in a first optical connector assembly 124, and a second plurality of optical channels 106 (for the sake of simplicity, only a single of the second plurality are shown in FIG. 1), each terminating in a second optical connector 170. A cowling 109 may be provided to protect the first plurality of optical channels 106. The system employs a stack 120 of fiber channel rotator assemblies 122, wherein each rotator assembly 122 includes a rotatable member 123 (such as a platter 223a, as shown in FIG. 2A, or a rotatable arm 223b, as shown in FIG. 2B), having a peripheral edge 210, disposed along a rotational plane and being rotatable about an axis 108. A first optical connector assembly 124 is optically coupled to a first optical channel of the first plurality 104 and is in sliding engagement with the rotatable member 123 adjacent to the peripheral edge 210.

A rotational driver 140, which may be embodied as an electric motor 142 mounted on a base 102, is coupled to the rotatable members 123 and selectively causes each of the rotatable members 123 to rotate about the axis 108, thereby directing the first optical connector assembly 124 to a selected angular position. The motor 142 is rotationally coupled to a spindle 144 and engages each rotational member 123 via a clutch assembly 130.

Each clutch assembly 130 includes a first engagement member 132, affixed to a rotational member 123, and a second engagement member 136, affixed to the spindle 144. The clutch assembly 130 could use one of several types of clutch mechanisms known to the art, including: an indexing pin clutch, which would offer the advantage of providing precise alignment; a fiction clutch, which would offer the advantage of ease of manufacturing; and an articulated tooth clutch, which would offer the advantage of reducing slippage while still being relatively easy to manufacture. Choice of the clutch type would depend on such design considerations as: cost, strength of electromagnet and degree of precision required.

A magnetic driver 134 causes the first engagement member 132 to selectively engage the second engagement member 136, thereby transferring rotational force from the spindle 144 to the rotational member 123. Such a magnetic driver 134 could include an electromagnet disposed adjacent to, or embedded in, either the first engagement member 132 or the second engagement member 136. The electromagnet attracts the respective opposite engagement member 132 or 136 to the adjacent engagement member 136 or 132 when the electromagnet is activated. A mechanical driver, e.g., a pneumatic driver or hydraulic driver, could be employed to perform this function without departing from the scope of the invention. The magnetic driver 134 also causes the first engagement member 132 to selectively disengage the second engagement member 136, thereby ceasing transfer of rotational force from the spindle 144 to the rotational member 123. This could be accomplished by simply discharging the electromagnet 134, thereby releasing the opposing engagement member from magnetic attraction, or by reversing the polarity of the current energizing the electromagnet 134, thereby applying a repulsive force to the opposing engagement member. In the latter case the opposing engagement member would be permanently magnetized.

Circularly disposed about the fiber channel rotator assemblies 122 is a plurality of towers 150. Each tower includes a track 154 mounted on a frame 152 and is disposed adjacent to and transverse to the rotational plane of each of the rotatable members 123. A second optical connector 170, complementary to each of the first optical connectors 222, is optically coupled to a second optical channel 106 and is slidably engaged with the track 154 so as to be able to move along the track 154. A linear driver 156 drives the second optical connector 170 along the track 154. Thus, the second optical connector 170 may be moved to a selected linear position, adjacent one of the first optical connectors 124, along the track 154.

The linear driver 156, in one embodiment, includes a cable/pulley assembly that includes a first pulley 158 mounted on one end of the frame 152 and a second 160 pulley mounted on the opposite end of the frame 152. The first pulley 158 and the second pulley 160 are rotationally coupled via a cable 162 that is attached to the second optical connector 170. It is understood that other types of linear drivers, including pneumatic and hydraulic, could be employed without departing from the scope of the invention.

A controller 180, e.g., a micro-controller or microprocessor, that is in control communication with the rotational driver 140, and the linear driver 156, causes the rotational driver 140 to rotate the first optical connector 124 to the selected angular position and causes the linear driver 156 to move the second optical connector 170 to the selected linear position. Thus, the first optical connector 124 is moved to a position adjacent the second optical connector 170. The controller 180 is coupled to the clutch assembly 130 via a clutch control line 232. An actuator 220 selectively causes the first optical connector 124 and the second optical connector 170 to engage, so that the first optical channel 104 becomes optically coupled to the second optical channel 106. The actuator 220 is coupled to the controller 180 via an actuator control line 234.

Figure 3A:
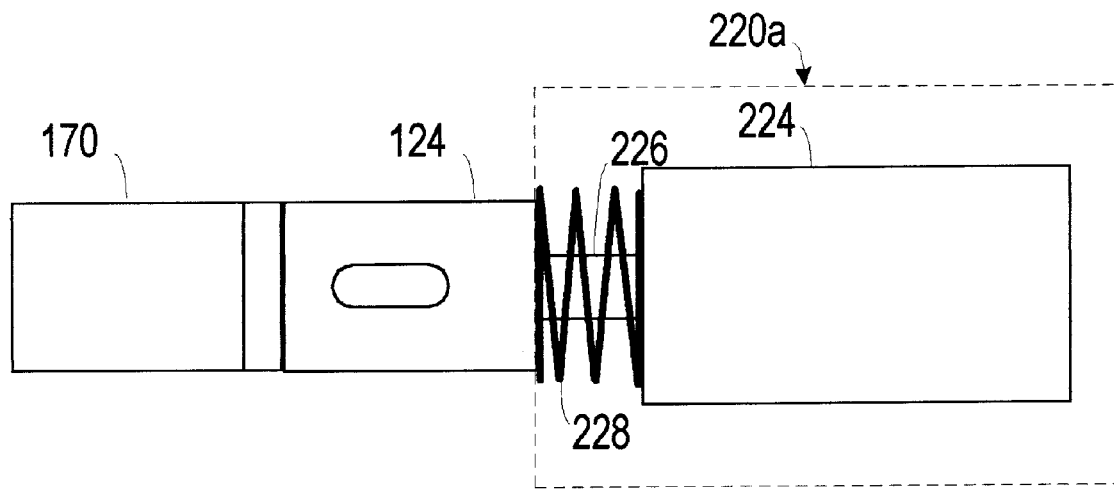
FIG. 3A is a schematic diagram of the optical couplers in an engaged state and the actuator.
Figure 3B:
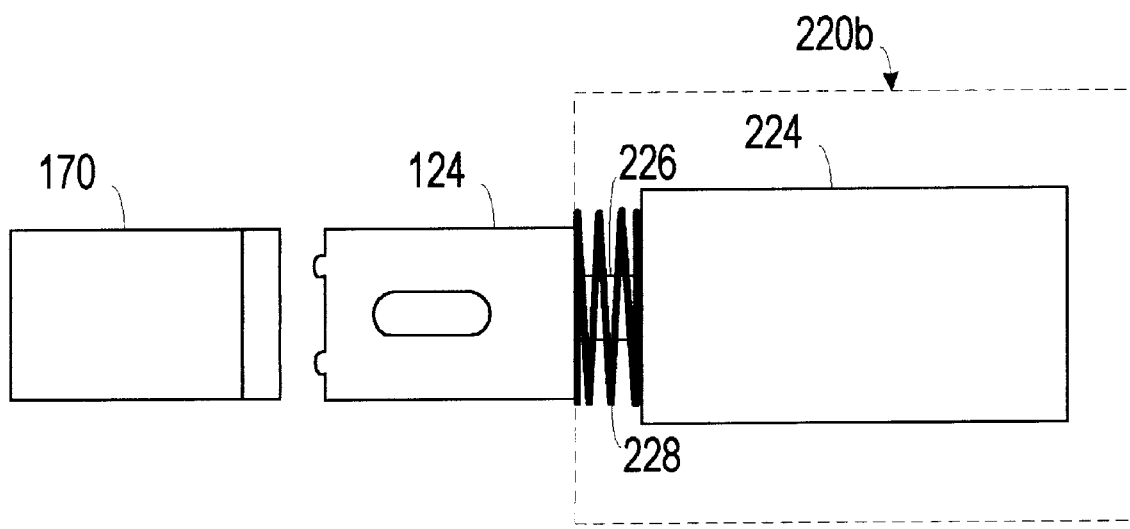
FIG. 3B is a schematic diagram of the optical couplers in a retracted state and the actuator.

The actuator 220 is shown in more detail in FIGS. 3A and 3B, and includes a solenoid 224 having a piston 226 that is loaded with a spring 228. The actuator 220 has an extended state 220a and a retracted state 220b. Because the solenoid 224 is spring-loaded, if power to the solenoid 224 fails, then the spring 228 will ensure that the first optical connector 124 remains engaged with the second optical connector 170 (as shown in FIG. 3A). It is only when the solenoid 224 is energized that the piston 226 retracts so as to disengage the first optical connector 124 from the second optical connector 170 (as shown in FIG. 3B).

Figure 4A:
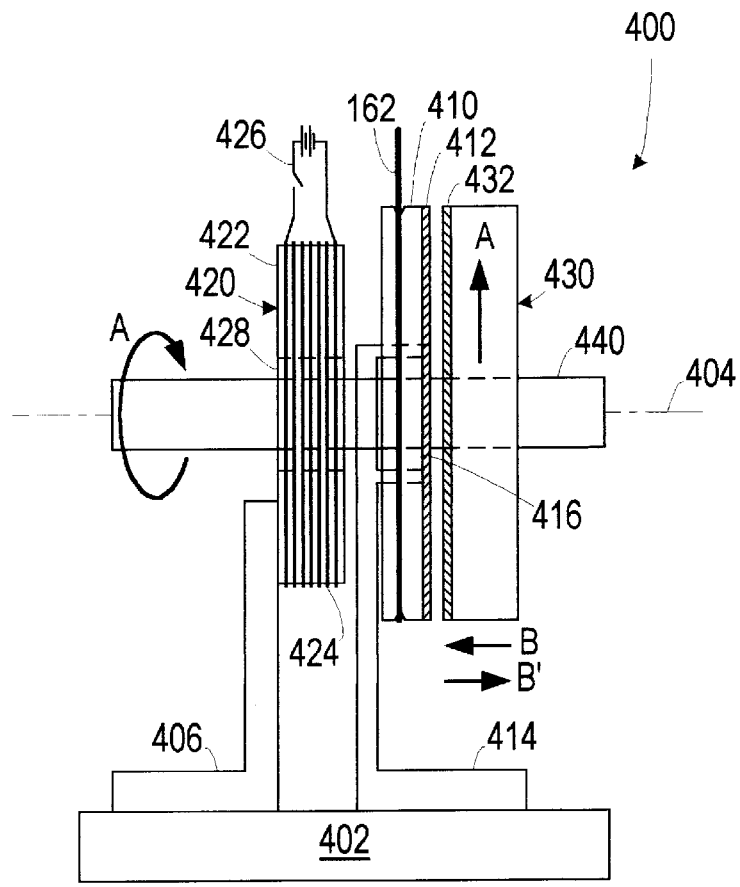
FIG. 4A is an elevation view of the clutch/pulley assembly.
Figure 4B:
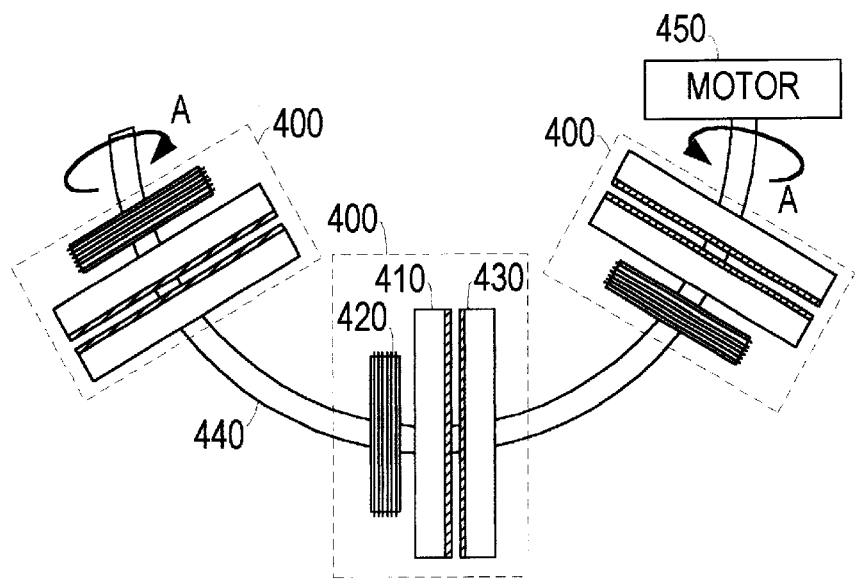
FIG. 4B is a plan view of several clutch/pulley assemblies and the flexible axle coupled to the motor.

As shown in FIGS. 4A and 4B, the pulley/clutch assemblies 400 selectively rotationally couple a pulley 410 (which could be either the first pulley 158 or the second pulley 160, depending on space requirements and the configuration desired for the particular application of the invention) to a flexible axle 440 rotationally coupled to a motor 450, thereby causing the pulley 410 to rotate, thus causing the second optical connector 170 to move along the track 154. The flexible axle 440 could comprise any material that is flexible and yet could rotate uniformly. For example, acceptable materials include steel cable and flexible rubber, the choice of material depending on the specific application.

Each pulley/clutch assembly 400 includes a pulley 410, an electromagnet 420 and a clutch member 430. A flexible axle 440 passes along the axis 404 of the assembly 440 through a first axial passage 428 defined by the pulley 410 and through a second axial passage 416 defined by the electromagnet 420. The axle 440 also passes through the clutch member 430, but is coupled thereto so as to cause the clutch member 430 to rotate in direction A along with the axle 440. (Although only one direction of rotation A is shown in FIGS. 4A and 4B, the axle 440 is capable of causing the pulley 410 to rotate in both directions, thereby allowing both up and down movement of the second optical connector 170.)

The electromagnet 420 includes a ferrous core 422 that is affixed to a frame 406 mounted on a substrate 402 and a plurality of coils 424 wound around the core 422. The coils 424 are energized by a circuit 426 that is selectively controlled by the control unit 180 (as shown in FIG. 1).

The pulley, which is rotationally coupled to a frame 414 and that is also mounted on the substrate 402, has a first engagement surface 412 that is disposed opposite a second engagement surface 432 disposed on the clutch member 432. When the electromagnet 420 is energized, then the clutch member 430 is drawn in direction B to the pulley 410 so that the first engagement surface 412 engages the second engagement surface 432. When the electromagnet 420 is de-energized, the clutch member 430 is allowed to move away from the pulley 410 in direction B'. Alternatively, the clutch member 430 may be permanently magnetized and driven in direction B' by reversing polarity of the energizing circuit 426 on the coils 424. In an alternate embodiment, the pulley 410 is drawn to the clutch member 430, rather than vise versa. Furthermore, in another alternate embodiment, the electromagnet 420 could be integrated into either the pulley 410 or the clutch member 430.

Returning to FIG. 1, one of the rotating members 123 could have a cleaning device 125 disposed thereon instead of an optical connector 124. Such a cleaning device 125 could include a compressed air nozzle or a vacuum nozzle supplied by a supply line 105 coupled to a compressed air supply or vacuum supply, respectively. The cleaning device would be used to periodically clean the surface of the second optical couplers 170, thereby ridding them of dust. Similarly, the one of the towers 150 could have a cleaning device, for cleaning the first optical couplers 124, included in place of the second optical coupler 170.

To couple a first optical fiber channel 104 to a second optical fiber channel 106, the following steps are performed: the first optical connector 124 is rotated about the axis to an angular position that puts it adjacent the tower 150 housing the desired second optical connector 170; the second optical connector 170 is moved along the track 154 to a linear position so that the second optical connector 170 is adjacent to the first optical connector 124; and the first optical connector 124 is engaged to the second optical connector 170 by de-energizing the solenoid 224 so that the spring 228 forces the first optical connector 124 to mate with the second optical connector 170. To disconnect the first optical connector 124 from the second optical connector 170, the solenoid 224 is energized, causing the piston 226 to pull the first optical connector 124 away from the second optical connector 170. Typically, prior to performing the above-recited steps, the connectors to be coupled would be sent to the cleaning devices to have any accumulated dust removed therefrom.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An apparatus for making connections between a first plurality of optical channels and a second plurality of optical channels, comprising:
    a. at least one fiber channel rotator, comprising:
        i. a rotatable member, having a peripheral edge, disposed along a rotational plane and being rotatable about an axis;
        ii. a first optical connector that is optically coupled to a first optical channel, the first optical connector in sliding engagement with the rotatable member adjacent to the peripheral edge; and
        iii. a rotational driver coupled to the rotatable member so as to selectively cause the rotatable member to rotate about the axis and thereby direct the first optical connector to a selected angular position;
    b. at least one tower, comprising:
        i. a track, disposed adjacent to the rotatable member and transverse to the rotational plane of the rotatable member;
        ii. a second optical connector, complementary to the first optical connector, that is optically coupled to a second optical channel and that is slidably engaged with the track so as to be able to move along the track; and
        iii. a linear driver that drives the second optical connector along the track so as to cause the second optical connector to be moved to a selected linear position along the track;
    c. a controller, in control communication with the rotational driver and the linear driver, that causes the rotational driver to rotate the first optical connector to the selected angular position and that causes the linear driver to move the second optical connector to the selected linear position, so that the first optical connector is adjacent the second optical connector; and
    d. an actuator that selectively causes the first optical connector and the second optical connector to engage, so that the first optical channel becomes optically coupled to the second optical channel.

2. The apparatus of claim 1, wherein the rotatable member is a disk, having a center coincident with the axis and a circumference coincident with the peripheral edge.

3. The apparatus of claim 1, wherein the rotatable member is an arm having a first end rotationally coupled to the axis and an opposite second end coincident with the peripheral edge.

4. The apparatus of claim 1, wherein the rotational driver comprises:
    a. a motor;
    b. a spindle, rotationally coupled to the motor; and
    c. a clutch assembly that selectively couples the rotational member to the spindle.

5. The apparatus of claim 4, wherein the clutch assembly comprises:
    a. a first engagement member, affixed to the rotational member;
    b. a second engagement member, affixed to the spindle; and
    c. a magnetic driver that causes the first engagement member to selectively engage the second engagement member, thereby transferring rotational force from the spindle to the rotational member, and that causes the first engagement member to selectively disengage the second engagement member, thereby ceasing transfer of rotational force from the spindle to the rotational member.

6. The apparatus of claim 1, wherein the linear driver comprises:
    a. a frame having a top end and an opposite bottom end;
    b. a first pulley affixed to the top end of the frame;
    c. a second pulley affixed to the second end of the frame;
    d. a cable rotationally coupling the first pulley to the second pulley, a portion of the cable being parallel to the track, the second optical connector being attached to the cable so that as the cable moves about the first pulley and the second pulley the second optical connector moves along the track; and
    e. a motor;
    f a pulley/clutch assembly that selectively rotationally couples a selected one of the first pulley or the second pulley to the motor, thereby causing the selected pulley to rotate and thereby causing the second optical connector to move along the track.

7. The apparatus of claim 1, wherein the controller comprises a digital processor.

8. The apparatus of claim 1, wherein the actuator comprises:
    a. a spring disposed so as to exert outward radial force on the first optical connector; and b. a solenoid, affixed to the first optical connector and the rotatable member, the solenoid having a retracted position, in which the solenoid exerts inward radial force on the first optical connector, and an extended position, in which the solenoid does not resist outward radial force exerted on the first optical connector by the spring.

9. The apparatus of claim 1, further comprising:
   a. a second rotational member having a second peripheral edge, spaced apart from and disposed co-axially with the first rotation member;
   b. a first compressed air nozzle disposed along the second peripheral edge and in communication with a compressed air supply;
   c. a rotational driver coupled to the second rotatable member so as to selectively cause the second rotatable member to rotate about the axis to direct the first compressed air nozzle to a second selected angular position;
   d. a controller that selectively causes compressed air to exit the first compressed air nozzle, whereby the compressed air cleans the second optical connector when the second optical connector is adjacent the first compressed air nozzle and when compressed air exits the first compressed air nozzle.

10. The apparatus of claim 1 further comprising a second tower, including:
    a. a track, disposed adjacent to the rotatable member and transverse to the rotational plane of the rotatable member;
    b. a second compressed air nozzle that is slidably engaged to the track so as to be able to move along the track and that is in communication with a compressed air supply;
    c. a linear driver that drives the second compressed air nozzle along the track so as to cause the second compressed air nozzle to be moved to a second selected linear position along the track; and
    d. a controller that selectively causes compressed air to exit the second compressed air nozzle, whereby the compressed air cleans the first optical connector when the first optical connector is adjacent the second compressed air nozzle and when compressed air exits the second compressed air nozzle.

11. The apparatus of claim 1, further comprising:
    a. a second rotational member having a second peripheral edge, spaced apart from and disposed co-axially with the first rotation member;
    b. a first vacuum nozzle disposed along the second peripheral edge and in communication with a vacuum source;
    c. a rotational driver coupled to the second rotatable member so as to selectively cause the second rotatable member to rotate about the axis to direct the first vacuum nozzle to a second selected angular position;
    d. a controller that selectively causes the vacuum supply to be in fluid communication with the first vacuum nozzle, whereby dust is removed from the second optical connector through the first vacuum nozzle.

12. The apparatus of claim 1, further comprising a second tower, including:
    a. a track, disposed adjacent to the rotatable member and transverse to the rotational plane of the rotatable member;
    b. a second vacuum nozzle that is slidably engaged to the track so as to be able to move along the track and that is in communication with a vacuum source;
    c. a linear driver that drives the second vacuum nozzle along the track so as to cause the second vacuum nozzle to be moved to a second selected linear position along the track; and
    d. a controller that selectively causes the vacuum supply to be in fluid communication with the second vacuum nozzle, whereby dust is removed from the first optical connector through the second vacuum nozzle.

13. An apparatus for making connections between a first plurality of optical channels and a second plurality of optical channels, comprising:
    a. a plurality of fiber channel rotators, each rotator comprising:
       i. a rotatable member, having a peripheral edge, each rotatable member disposed along a rotational different plane and each rotatable member being rotatable about a common axis; and
       ii. a first optical connector that is optically coupled to a selected one of a first plurality of optical channels, the first optical connector being affixed to the rotatable member adjacent to the peripheral edge;
    b. a rotational driver assembly coupled to each rotatable member so as to selectively cause a rotatable member of the plurality of rotatable members to rotate about the common axis and thereby direct the first optical connector to a selected angular position;
    c. a plurality of spaced apart towers circularly disposed about the plurality of fiber channel rotators, each tower comprising:
       i. a track, disposed transverse to the rotational plane of each of the rotatable members; and
       ii. a second optical connector, complementary to each of the optical connectors of the first plurality of rotators, that is optically coupled to a selected one of a second plurality of optical channels and is slidably engaged with the track so as to be able to move along the track;
    d. a plurality of linear drivers that selectively drive each second optical connector along the track to which each second optical connector is engaged so as to cause a selected second optical connector to be moved to a selected linear position along the track;
    e. a controller, in control communication with rotational driver and the linear driver, that causes the rotational driver to rotate a selected first optical connector to a selected angular position and that causes the linear driver to move a selected second optical connector to a selected linear position, so that the selected first optical connector is adjacent the selected second optical connector; and
    f. a plurality of actuators, wherein each actuator selectively causes a selected first optical connector and a selected second optical connector to engage, so that the a first optical channel becomes coupled to a second optical channel.

14. The apparatus of claim 12, wherein each linear driver comprises:
    a. a plurality of linear drivers, each linear driver comprising:
       i. a frame having a top end and an opposite bottom end;
       ii. a first pulley affixed to the top end of the frame;
       iii. a second pulley affixed to the second end of the frame;
       iv. a cable rotationally coupled the first pulley and to the second pulley, a portion of the cable being parallel to the track, the second optical connector of a respective tower being attached to the cable so that as the cable moves about the first pulley and the second pulley the second optical connector moves along the track; and v. pulley/clutch assembly rotationally coupled to a selected one of the first pulley or the second pulley, so as selectively to cause the pulley to rotate about an axis;

b. a flexible axle coaxially coupled to each pulley/clutch assembly so as selectively to cause rotation of any one of the selected pulleys as the flexible axle rotates; and c. a motor that is rotationally coupled to the flexible axle, capable of causing the flexible axle to rotate.

15. The apparatus of claim 13, wherein each pulley/clutch assembly comprises:

a. a rotatable clutch member disposed adjacent to and coaxially with the pulley, the clutch member being at least partially ferrous and including a first engagement surface;

b. a second engagement surface disposed on the pulley, opposite the first engagement surface; and c. a magnetic member, having a magnetized state and a non-magnetized state, the pulley being disposed between the clutch member and the magnetic member whereby when the magnetic member is in the magnetized state, the clutch is drawn to the pulley thereby causing the first engagement surface to engage the second engagement surface so that the pulley is in rotational engagement with the clutch member and whereby when the magnetic member is in the non-magnetized state, the clutch is not drawn to the pulley thereby allowing the first engagement surface to disengage from the second engagement surface.

* * * * *